United States Patent [19]

Andersen

[11] Patent Number: 4,488,805
[45] Date of Patent: Dec. 18, 1984

[54] REPRODUCTION CAMERA CONTROL SYSTEM

[75] Inventor: Steen Andersen, Allerød, Denmark

[73] Assignee: Océ-Helioprint AS, Kvistgaard, Denmark

[21] Appl. No.: 495,597

[22] Filed: May 18, 1983

[30] Foreign Application Priority Data

May 26, 1982 [NL] Netherlands ........................ 8202142
Nov. 12, 1982 [NL] Netherlands ........................ 8204380

[51] Int. Cl.³ .............................................. G03B 27/72
[52] U.S. Cl. ........................................ 355/69; 355/71
[58] Field of Search ................ 355/69, 71; 235/454

[56] References Cited

U.S. PATENT DOCUMENTS

| | | | |
|---|---|---|---|
| 3,611,159 | 10/1971 | Florsheim, Jr. et al. ......... | 355/69 X |
| 3,619,055 | 11/1971 | Archer et al. .................... | 355/69 |
| 3,712,730 | 1/1973 | Florsheim, Jr. et al. ......... | 355/69 |
| 3,796,491 | 3/1974 | McIntosh et al. ............... | 355/69 |
| 4,021,115 | 5/1977 | Jeppesen ......................... | 355/56 |

FOREIGN PATENT DOCUMENTS

| | | |
|---|---|---|
| 8204,380 | 5/72 | Switzerland . |
| 0963,363 | 3/82 | United Kingdom . |

Primary Examiner—Richard A. Wintercorn
Attorney, Agent, or Firm—Albert C. Johnston

[57] ABSTRACT

A reproduction camera employed for the production of contact screen prints from an original is provided with a control system including a computer means which, after feeding in data representing the minimum and maximum optical densities of the original, the optical data of the screen used and the required data of the camera and the light sensitive material such as film, determines and applies a dosage for the main exposure and one or more additional exposures to yield a screened print of which the highlight dots and the shadow dots have specific sizes correspondingly substantially completely to the minimum and maximum optical densities of the original. The computer means includes an adjustable basic screen range regulator for varying the main exposure at the time of the adaption of at least one of the additional exposures in order to continue to reproduce substantially completely the minimum and maximum optical densities of the original with the specific dot sizes.

7 Claims, 4 Drawing Figures

REPRODUCTION CAMERA CONTROL SYSTEM

This invention relates to a reproduction camera for the production of contact screen prints from an original.

In screen photography, an original is reproduced on a graphic film through a contact screen in order to convert continuous tones having a specific optical density on the original into screened half-tones having the same optical density on the film. To this end the half-tones on the film are made by means of screen dots of different sizes. There is a fixed relationship between the screen dot size and the average optical density of the area containing the dots. Expressed as a formula:

$$D = \log \frac{1}{1-a} \quad (1)$$

where D is the optical density and a is the fraction of the area occupied by dots.

Contact screens are used in many versions and may differ, for example, in the optical density gradient in an individual dot. The maximum optical densities of screens may also differ. If the original exhibits a large optical density variation, a contact screen having a high maximum optical density will be used, and if the original has a small optical density variation, a contact screen having a small maximum optical density will be used.

Every contact screen has a so-called "basic screen range" which indicates the contrast range of the original that can just be reproduced. For example, a standard screen has a basic screen range of 1.1, which means that an original having a contrast range of 1.1 can just be reproduced properly without special provisions having to be made when this screen is used.

Originals having a contrast range greater than corresponds to the basic screen range of a screen can be reproduced by employing a non-imagewise additional exposure through the screen, which usually is a flash exposure. Here again there is a fixed relationship between the maximum reproducible contrast of an original and the amount of additional exposure when a contact screen having a specific basic screen range $R_o$ is used. Expressed as a formula:

$$R - R_o = -\log\left(1 - \frac{F}{F_o}\right) \quad (2)$$

where R is the contrast range of an original, F is the required flash exposure and $F_o$ is the basic flash exposure established in a specific system.

Conditions are more difficult when the contrast range of the original is less than the basic screen range of the screen used. Trial and error can then be used to apply to the film, in addition to a main exposure, an imagewise additional exposure, sometimes referred to as a "bump", without the screen being present.

It is also possible to select for each original a contact screen whose basic screen range corresponds to the contrast range of that original. To enable any original to be reproduced properly by such selection, as is desirable, a large number of contact screens is required and the procedure is very time consuming.

It is an object of this invention to provide a reproduction camera with a control system which eliminates the need for selecting a screen that will correspond to the contrast range of the original to be reproduced, and which also determines the correct main and additional exposures required for reproducing any specific original in the required manner.

A camera for which the present invention is provided corresponds to known reproduction cameras in respect of its basic functional components, which typically comprise a platen for a contact screen and a light-sensitive material, means for exposing light to an original to be reproduced, an optical system for projecting an image of the original onto the plane of the light-sensitive material, and means for controlling the light dosage of each exposure, which exposure may comprise an imagewise main exposure of the light-sensitive material through the contact screen with or without either or both of an imagewise additional exposure of the material without the screen and a non-imagewise additional exposure thereof through the contact screen.

In accordance with the present invention the camera further comprises a control system including a computer provided with data input means and output means and which, after receiving data representing the minimum and maximum optical densities of the original, the optical data of the contact screen being used and the required data of the camera and the light-sensitive material, determines and applies via the exposure controlling means a dosage for the main exposure and a dosage or dosages for at least one of the abovementioned additional exposures so as to yield a screened, or half-tone, print having a specific size of the highlight dots and a specific size of the shadow dots which correspond substantially completely to the minimum and maximum optical densities of the original. The computer input means includes an adjustable basic screen range regulator for varying the specific main exposure and at the same time adapting at least one of the additional exposures to suit the needs for reproduction of an original having a contrast range to which the basic screen range of the screen being used does not correspond, so that the camera will continue to reproduce substantially completely the maximum and minimum optical densities of each original with such specific dot sizes.

Other objects, features and advantages of the invention will become apparent from the following description in which reference is made to the accompanying drawings. In the drawings.

The basic functional components of a reproduction camera in which the present invention is embodied may correspond, for example, to those shown in U.S. Pat. No. 4,021,115, the disclosure of which is hereby incorporated herein by reference.

Figure 1:
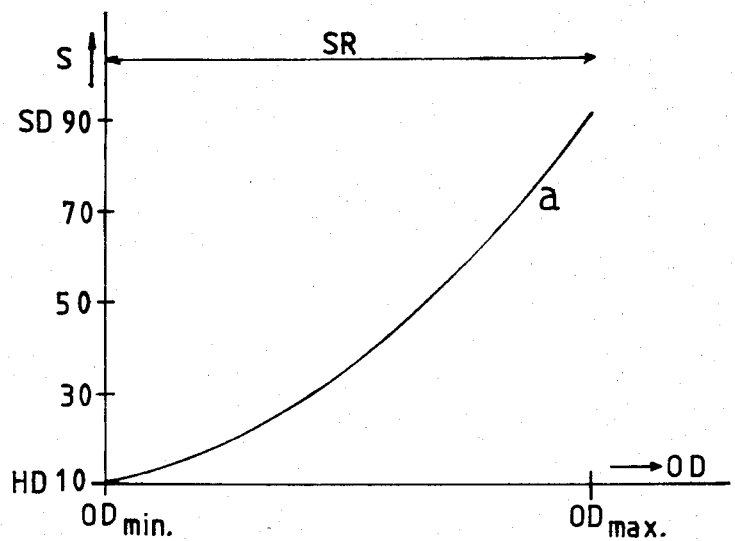
FIG. 1 is a graph representing optical density as a function of dot sizes for an original of which the contrast range is identical to the basic screen range of the screen.
Figure 2:
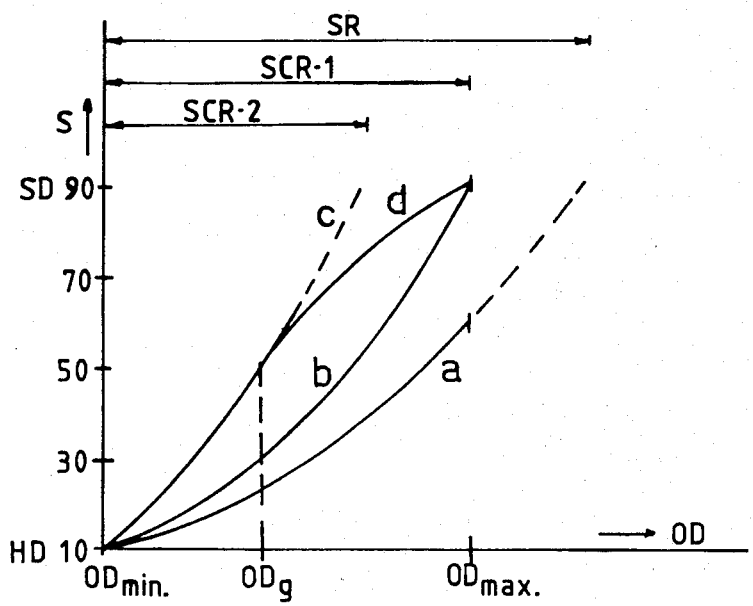
FIG. 2 is a graph representing relationships of optical density and dot sizes for an original having a contrast range less than the basic screen range of the screen.
Figure 3:
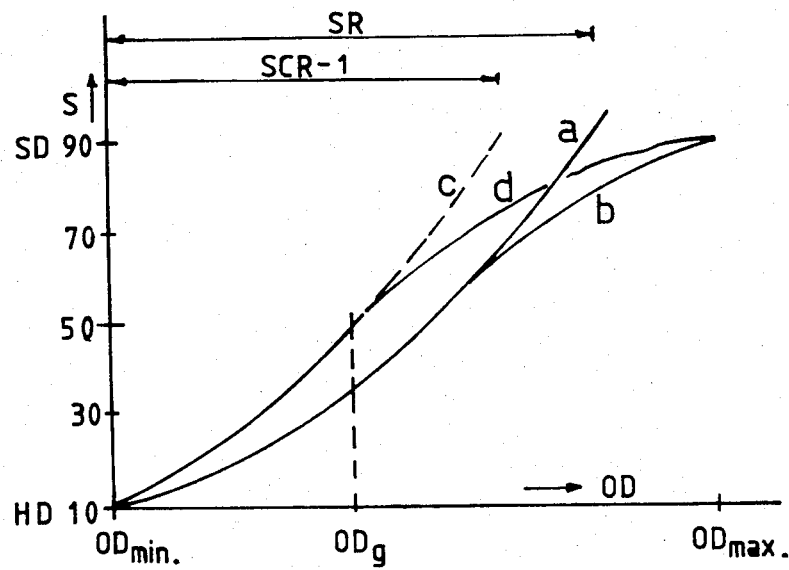
FIG. 3 is a graph representing such relationships for an original having a contrast range greater than the basic screen range of the screen.

In FIGS. 1 to 3 of the present drawings, the optical density (OD) of an original is plotted along the horizontal axis. The lightest part of an original that just should be reproduced is indicated by $OD_{min}$ and the darkest part that should be reproduced by $OD_{max}$. SR is the basic screen range of the contact screen used. The vertical axis shows the screen dot size (S) as a percentage of the maximum screen dot size.

It is generally desirable when using a positive film to reproduce the $OD_{min}$ of the original with a screen dot size of about 10% and the $OD_{max}$ of the original with a screen dot size of about 90%.

These dot size values are indicated in the figures as HD (highlight dots) and SD (shadow dots), respectively. When the contrast range of an original ($OD_{max.}-OD_{min.}$) corresponds to the basic screen range (SR) of the screen used, an imagewise (main) exposure through the screen gives an image having a density gradient as indicated by curve a in FIG. 1.

The exposure time for the main exposure depends on a number of constant factors such as, for example, imaging ratio, diaphragm opening, intensity of the light source, and so on. The only variable factor in these conditions is the $OD_{min.}$ of the original in accordance with the equation:

$$T_H = T_{H_o} \cdot 10^{OD\min.} \quad (3)$$

where $T_H$ is the main exposure time and $T_{H_o}$ is the basic main exposure time.

When an original having a contrast range less than that corresponding to the basic screen range of the screen is to be reproduced, an imagewise main exposure through the screen will yield an image having a density gradient as indicated by curve a in FIG. 2. The darkest parts of the original are here reproduced with a dot size of about 60%, i.e. much too light. By now applying an imagewise additional exposure without a screen, an image is obtained having the density gradient indicated by curve b. Thus, the darkest parts of the original are now reproduced with a screen dot size of 90%. The amount of imagewise additional exposure ($T_B$) to be applied without a screen is determined by means of the following formula:

$$T_B = T_{B_o} \cdot 10^{OD\min.} \times \left(1 - \frac{10^{(OD\max. - OD\min.)} - 1}{10^{SR} - 1}\right) \quad (4)$$

where $T_{B_o}$ is the imagewise basic additional exposure time and SR is the basic screen range of the contact screen. The sum of the main exposure and additional exposure must in these conditions remain the same in order to maintain the correct value for HD associated with $OD_{min.}$.

The density gradient obtained as indicated by curve b is identical to the curve that would be obtained if there were only a main exposure through a screen having a basic screen range SCR-1. By means of an imagewise additional exposure without a screen, it is therefore possible to select practically any wanted basic screen range.

In most cases the "wanted basic screen range" corresponds to the contrast range of the original, i.e. $OD_{max.}-OD_{min.}$ (curve b in FIG. 2). Sometimes, however, it is desired to deviate from this. In that case, the "wanted basic screen range" (SCR) must be introduced into formula (4) instead of the factor $OD_{max.}-OD_{min.}$. The formula for the imagewise additional exposure without a screen thus becomes:

$$T_B = T_{B_o} \cdot 10^{OD\min.} \times \left(1 - \frac{10^{SCR} - 1}{10^{SR} - 1}\right) \quad (5)$$

FIG. 2 indicates at $OD_g$ the average grey value occurring in the original. When the density gradient on the film is as indicated by curve b, the $OD_g$ is reproduced with a dot size of about 30%. It is desirable, however, to reproduce the average grey of an original with a dot size of about 48%. If a "wanted basic screen range" SCR-2 is now set and then, in accordance with formula (5), an imagewise additional exposure without a screen is applied, this additional exposure together with the main exposure yields a density gradient on the film as is indicated by curve c. This curve corresponds to the curve that would be obtained if there were only a main exposure through a screen having a basic screen range SCR-2. If now a non-imagewise additional exposure with a screen is used, the amount of which is calculated in known manner, the density gradient on the film becomes as indicated by curve d. The maximum and minimum optical densities of the original are in this way reproduced on the film with a specific screen dot size for the highlight dots and a specific screen dot size for the shadow dots.

FIG. 3 illustrates the relationships for the case in which the contrast range of the original is greater than the basic screen range of the screen. A main exposure yields an image the density gradient of which is indicated by curve a. No contrast difference is now detectable in the shadow dots. A non-imagewise additional exposure through the screen, calculated in the manner described, yields an image the density gradient of which is indicated in curve b. Here too, the maximum and minimum optical densities of the original are reproduced on the film with a specific screen dot size for highlight dots and one for shadow dots.

If it is desired to reproduce the mid-tones of the original more darkly than is the case with curve b, an imagewise additional exposure without a screen can again be carried out. To this end, the "wanted basic screen range" SCR-1 is introduced into formula (5). The density gradient obtained on the film by means of this exposure is plotted as curve c (FIG. 3). A non-imagewise additional exposure through the screen then yields a density gradient as indicated by curve d.

Figure 4:
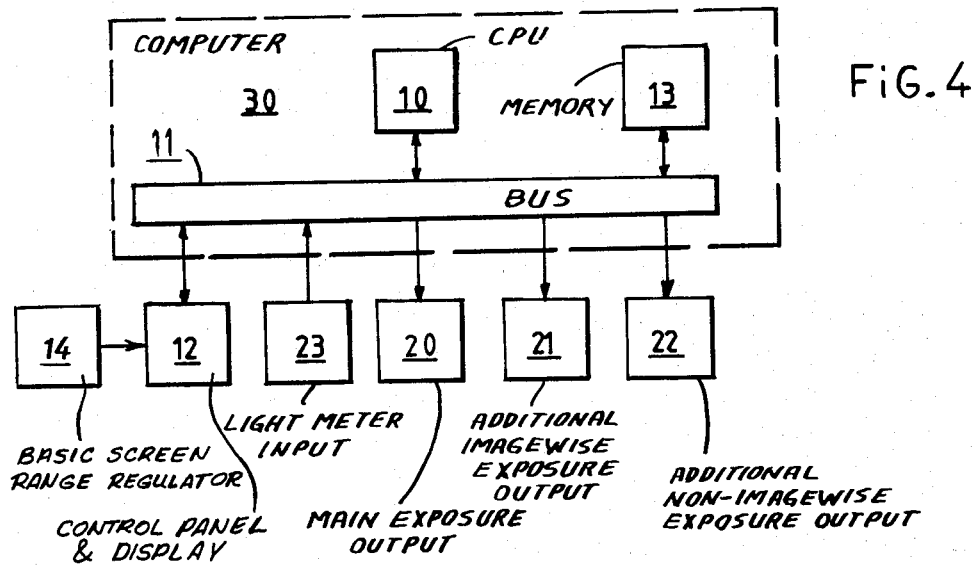
FIG. 4 is a schematic diagram of a computer provided with input and output means for setting exposures in accordance with the invention.

All these exposures are determined and effected according to the invention by means of a computer disposed in the reproduction camera. FIG. 4 schematically represents at 30 a computer equipped with suitable input and output means. The computer 30 comprises a central processing unit 10 (CPU), a bus system 11 and a memory 13. A control panel 12 is connected to the central processing unit (CPU) 10 via the bus system 11. The computer 30 automatically controls via its input and output means all kinds of functions of the reproduction camera, e.g. via device 20 the duration of the main exposure, via device 21 the duration of the imagewise additional exposure without a screen, and via device 22 the duration of the non-imagewise additional exposure with a screen.

When feeding in the data required for the control functions of the computer 30, for example, the aperture of the camera diaphragm is automatically detected by means of a sensor located at the diaphragm. Other data, such as the imaging ratio, are fed in via a keyboard disposed on the control panel 12. Data are displayed to the operator on a display also disposed on control panel 12.

The basic exposure times ($F_o$, $T_{Bo}$, $T_{Ho}$) are determined in the computer 30 by means of data representing the imaging ratio, lens, diaphragm, lamps, light-sensitivity of the film and basic screen range value of the screen. Data representing the $OD_{min.}$ and $OD_{max.}$ of the original are automatically fed into the computer from a light meter 23 arranged to view the original. If a non-automatic light meter is used, the $OD_{min.}$ and $OD_{max.}$ values can be read off from it and fed in via the keyboard on the front control panel 12.

If the contrast range of an original, i.e. $OD_{max.} - OD_{min.}$, is less than the basic screen range of the screen (e.g. as in FIG. 2), the computer causes a corresponding indication to appear on the display. The computer 30 can then make the "wanted basic screen range" equal to the contrast range of the original upon actuation of a key in the keyboard. In accordance with the formulas (3) and (5), which are stored in memory 13, the computer then calculates the main exposure time and the additional exposure time for an imagewise additional exposure without a screen, and causes the calculated times to be automatically applied and displayed on the display.

When the operator wants to set the computer for a different "wanted basic screen range", for reasons indicated in the description of FIG. 2, this is fed in by means of an adjustable basic screen range regulator 14 on control panel 12. The computer then calculates and applies again in accordance with formulas (3) and (5) and, if necessary, also according to formula (2), the exposure times for the main exposure and the additional exposure or exposures.

The adjustable basic screen range regulator 14 may be provided in the form of a keyboard of control 12 that operates in conjunction with the computer. When new data is entered with respect to an original, screen, camera or film, the basic screen range regulator returns to a standard condition.

The particular embodiment described above is not to be considered as limiting the scope of the invention or ways of utilizing it. For example, the adjustable basic screen range regulator may be in the form of a potentiometer coupled to an A/D converter and provided with a suitable graduated scale.

I claim:

1. In a reproduction camera for the production of contact screen prints from an original, including means for holding a contact screen and a light-sensitive material, means for exposing to light an original to be reproduced, an optical system for projecting a light image of the original onto the plane of the light-sensitive material, and means for controlling the light dosage of each exposure, a control system comprising computer means, computer output means and means for inputting to the computer means data representing the minimum and maximum optical densities of the original to be reproduced, optical characteristics of the screen being used and operating characteristics of said optical system, of said exposing means of the light-sensitive material, said computer means being responsive to such inputted data to determine for each said original, and being operative via said output means and said exposure controlling means to cause said exposing means to apply, a light dosage for an imagewise main exposure of said material through said screen and a light dosage or dosages for at least one of an imagewise additional exposure of said material without a screen and a non-imagewise additional exposure thereof through said screen so that a screened print is produced of which the highlight dots and the shadow dots have specific sizes corresponding substantially completely to the minimum and maximum optical densities of the original.

2. A reproduction camera according to claim 1, said output means including means activated by said computer means to produce an indication of the condition that exists when according to the data inputted to the computer means the range of optical densities of an original if less than the basic screen range of the screen being used, said inputting means including means operable upon an indication of said condition for activating said computer means to determine and to cause said exposing means to apply to the original a said light dosage for an imagewise main exposure and thereafter a said light dosage for an imagewise additional exposure without a screen.

3. A reproduction camera according to claim 1, said inputting means including a basic screen range regulator that is adjustable to set and input to said computer means data representing a wanted basic screen range suited for the contrast range of an original to be reproduced but different from the basic screen range of the screen being used, said computer means being responsive to such inputted screen range data to cause said exposure controlling means to vary the dosage for said main exposure and to adapt the dosage for at least one of said additional exposures so that a screened print will still be produced with highlight and shadow dot sizes corresponding substantially completely to the minimum and maximum optical densities of the original.

4. A reproduction camera according to claim 3, said basic screen regulator having a standard condition in which it does not input data affecting the dosage determinations, said computer means being operative when said regulator is in said standard condition to determine and cause application of a light dosage for a non-imagewise additional exposure of the original through said screen only when the effective screen range attainable by said main exposure and a said imagewise additional exposure without a screen is insufficient to produce a print with highlight dots and shadow dots having sizes corresponding substantially completely to the minimum and maximum optical densities of the original.

5. A reproduction camera according to claim 4, said basic screen range regulator including means operable by said computer means to return said regulator from an adjusted setting thereof to said standard condition in response to an inputting to said computer means of new data in respect of an original, the screen, or said operating characteristics.

6. A reproduction camera according to claim 3, said basic screen range regulator having a standard condition in which it does not input data affecting the dosage determinations, said regulator including means operable by said computer means to return said regulator from an adjusted setting thereof to said standard condition in response to an inputting to said computer means of new data in respect of the original, the screen, or said operating characteristics.

7. A reproduction camera according to claim 1, said inputting means including a light meter that senses and inputs data representing the maximum and minimum optical densities of an original.

* * * * *